UNITED STATES PATENT OFFICE.

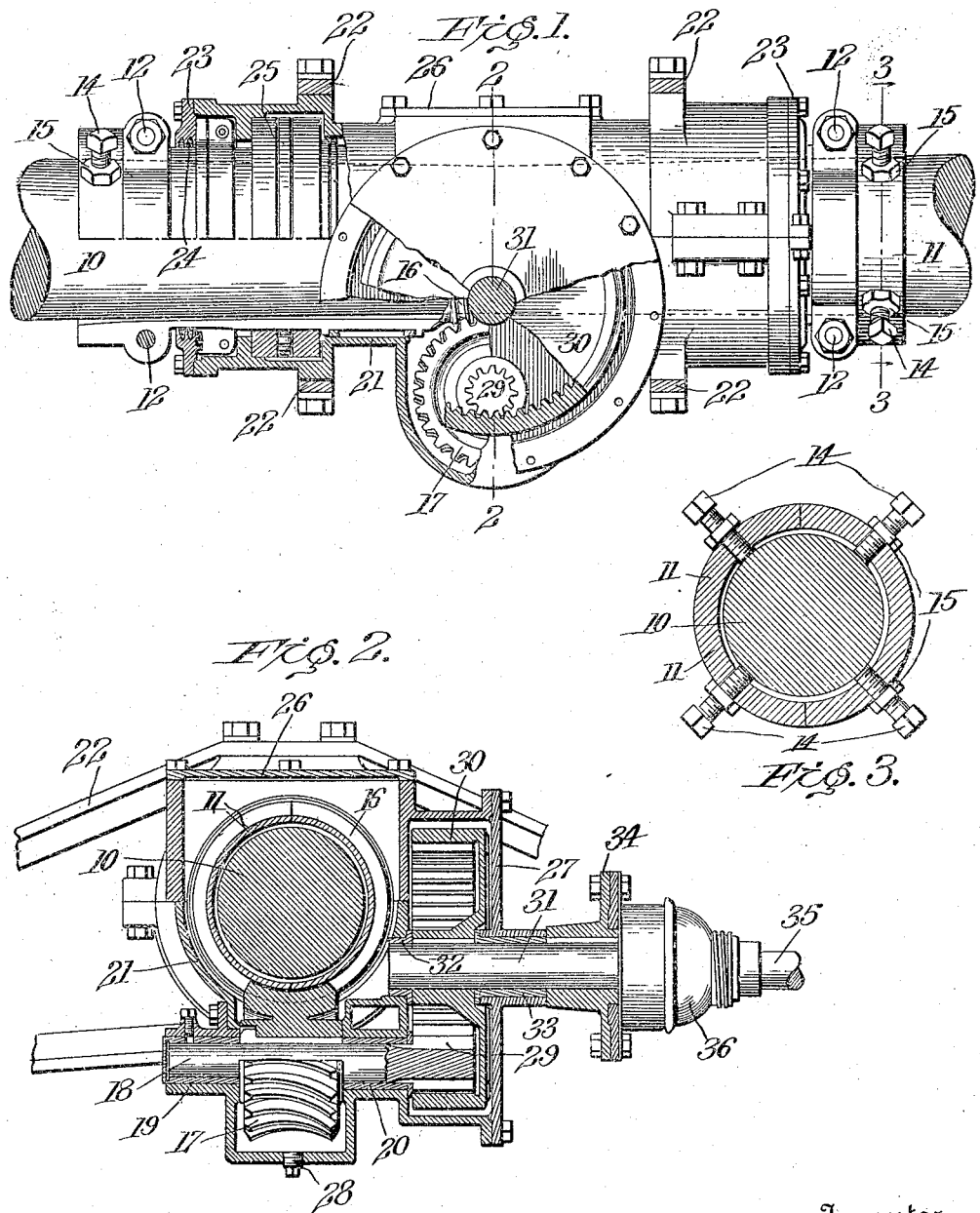

ALBERT HUPP, OF WASHINGTON, DISTRICT OF COLUMBIA.

CAR-AXLE MECHANISM.

1,200,356.                Specification of Letters Patent.        Patented Oct. 3, 1916.

Application filed February 26, 1915. Serial No. 10,749.

*To all whom it may concern:*

Be it known that I, ALBERT HUPP, a citizen of the United States, residing at Washington, District of Columbia, have invented certain new and useful Improvements in Car-Axle Mechanism, of which the following is a specification.

This invention relates to transmission mechanism for taking power from a car axle.

The objects of the invention are to provide a simple and compact mechanism, which shall be so connected with the car axle as to permit the usual bending, to which the axle is subjected in service, without affecting the transmission mechanism.

The transmission mechanism may be used to operate any mechanism desired, but is primarily intended for operating automatic mail exchange apparatus, where it is necessary to have a relatively large reduction in speed, from the speed of the axle.

The novel features of the invention will be apparent from the following description taken in connection with the accompanying drawings in which:—

Figure 1 is an elevation of a mechanism embodying the invention, certain parts being broken away; Fig. 2 is a section on the line 2—2 of Fig. 1; and Fig. 3 is a section on the line 3—3 of Fig. 1.

Referring to the drawings, 10 indicates a car axle which is surrounded by a split sleeve 11, the sleeve being spaced from the axle as shown in Fig. 1 and the parts thereof being secured together by means of bolts 12. In order to have the sleeve 11 spaced from the axle, so as to permit the usual vibration of the axle, to which it is subjected in service, and at the same time have the sleeve secured to the axle, I have provided two sets of radially arranged set screws and whereby the sleeve 11 may be adjusted on the axle so as to be concentric to the axis of rotation. After the screws 14 have been properly adjusted they may be locked in position by means of the nuts 15 or in any other suitable manner. The screw or worm 16 is secured on the sleeve 11 or may be formed integral therewith as shown in the drawings. The screw 16 meshes with and is adapted to rotate a gear 17 which is carried by a shaft 18, this shaft being mounted in bearings 19 and 20 of a casing 21 for the mechanism. The casing 21 is mounted on the sleeve 11 so that the latter will rotate therein and is held against rotation by brackets 22 or other suitable means secured to some part of the truck, so as to prevent the casing from rotating. The casing 21 is provided with the end plates 23 which carry felt rings 24 for the purpose of preventing dust from entering the casing, along the surface of the sleeve.

The end thrust on the casing, due to the re-action between the worm 16 and the gear 17 is taken by a pair of thrust bearings arranged on opposite sides of the middle of the axle, one of these bearings being shown at 25 in Fig. 1. The casing 21 has a top cover plate 26 and a removable side plate 27 and is adapted to contain a lubricant which may be introduced by removing the plate 26 and which may be drained from the casing by the removal of the plug 28.

The shaft 18 has a pinion 29 formed on the end thereof, this pinion meshing with an internal gear wheel 30 which is keyed to a shaft 31. The shaft 31 is supportd in bearings 32 and 33, and beyond bearing 33, is provided with a coupling 34 through which it is connected with a shaft 35, a universal joint being indicated at 36.

The casing 21 is split on a horizontal plane as shown in Fig. 1 and may therefore be readily removed from the sleeve 11. By having the sleeve 11 split as shown it may be applied to the axle after the wheels have been secured thereon. This permits the attachment of the mechanism to the axle after the car has gone into service.

The worm 16, coöperating with the gear 17 gives a large reduction in the speed so that the shaft 18 will revolve at only a fraction of the speed of the axle 10. The ratio of the pinion 29 to the internal gear 30 is such as to produce a further reduction in speed. As a result of this double reduction in speed, the shaft 31 makes one revolution for every one hundred and fifteen revolutions of the axle 10.

It will be observed that the mechanism is very compact and accessible and by making the casing 21 air tight the parts will be thoroughly lubricated and wear indefinitely. The sleeve 11, being secured to the axle by the two sets of set screws 14, will permit the usual flexing of the axle without disturbing the transimission gearing carried by the sleeve.

I claim—

1. In mechanism of the class described, the combination of a car axle, a sleeve surrounding the axle and spaced therefrom but secured thereto, a screw on said sleeve and concentric to the axis of said axle and a casing for said screw mounted on said sleeve and within which the latter rotates.

2. In mechanism of the class described, the combination of a car axle, a sleeve surrounding the axle and spaced therefrom, but secured thereto, a screw on said sleeve, a casing for said screw mounted on said sleeve, a wheel meshing with said screw and rotatably mounted in said casing, a transmission gearing operatively connected with said gear wheel.

3. In mechanism of the class described, the combination of a car axle, a sleeve surrounding the axle and secured thereto, a screw on said sleeve, a casing mounted on said sleeve and within which the latter rotates, a gear wheel rotatably mounted in said casing and meshing with said screw, a pinion operatively connected with said gear wheel, and a gear actuated by said pinion.

4. In mechanism of the class described, the combination of a car axle, a sleeve surrounding the axle and secured thereto, a screw on said sleeve, a casing mounted on said sleeve and within which the latter rotates, thrust bearings between said sleeve and casing, a gear wheel rotatably mounted in said casing and meshing with said screw, and transmission mechanism operatively connected with said gear wheel.

5. In mechanism of the class described, the combination of a car axle, a sleeve surrounding the axle and secured thereto, a screw on said sleeve, a casing mounted on said sleeve and within which the sleeve rotates, a gear wheel rotatably mounted in said casing meshing with said screw, a pinion operatively connected with said gear wheel, and an internal gear meshing with said pinion.

6. In mechanism of the class described, the combination of a car axle, a sleeve surrounding said axle and spaced therefrom but secured thereto, a screw on said sleeve, a casing mounted on said sleeve and within which the latter rotates, thrust bearings between said casing and said sleeve, a gear wheel rotatably mounted in said casing and meshing with said screw, and transmission mechanism operatively connected with said wheel.

In testimony whereof I affix my signature in presence of two witnesses.

ALBERT HUPP.

Witnesses:
B. M. KENT,
ARTHUR L. BRYANT.